United States Patent
Lagadec et al.

(10) Patent No.: US 8,812,328 B2
(45) Date of Patent: *Aug. 19, 2014

(54) METHOD FOR TRANSMITTING AN ANONYMOUS REQUEST FROM A CONSUMER TO A CONTENT OR SERVICE PROVIDER THROUGH A TELECOMMUNICATION NETWORK

(71) Applicant: Swisscom AG, Bern (CH)

(72) Inventors: Roger Lagadec, Regensdorf (CH); Didler Durand, Jougne (FR); Christophe Taddei, Lausanne (CH)

(73) Assignee: Swisscom AG (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,001

(22) Filed: Feb. 26, 2013

(65) Prior Publication Data

US 2013/0179355 A1 Jul. 11, 2013

Related U.S. Application Data

(63) Continuation of application No. 12/537,453, filed on Aug. 7, 2009, now Pat. No. 8,401,867, which is a continuation of application No. 10/704,859, filed on Nov. 10, 2003, now Pat. No. 7,590,547, which is a continuation of application No. PCT/EP02/04009, filed on Apr. 10, 2002.

(51) Int. Cl.
G06Q 30/02 (2012.01)
G06Q 10/10 (2012.01)
G06Q 10/06 (2012.01)
G06Q 30/06 (2012.01)
G06Q 10/08 (2012.01)

(52) U.S. Cl.
USPC .............................................. 705/1.1

(58) Field of Classification Search
None
See application file for complete search history.

(56) References Cited

U.S. PATENT DOCUMENTS

| 5,835,087 A | 11/1998 | Herz et al. |
| 6,343,274 B1 | 1/2002 | McCollom et al. |
| 2001/0014911 A1 | 8/2001 | Doi et al. |
| 2001/0036224 A1 | 11/2001 | Demello et al. |

(Continued)

FOREIGN PATENT DOCUMENTS

| EP | 1017205 | 7/2000 |
| EP | 1033854 | 9/2000 |

(Continued)

OTHER PUBLICATIONS

Gabber, E. et al.: "How to Make Personalized Web Browsing Simple, Secure, and Anonymous:" Financial Cryptography International Conference, 1997.

(Continued)

*Primary Examiner* — Jonathan Ouellette

(74) *Attorney, Agent, or Firm* — McAndrews, Held & Malloy, Ltd.

(57) ABSTRACT

A method and system for use in allowing a content or service provider to establish an anonymous profile of a consumer using at least one request sent by the consumer through a communication network. The request sent by the consumer includes identification data of the consumer. The identification data is substituted in the network with an alias so as to anonymize the request. The identification data is not accessible to the content or service provider and there is a correspondence between the identification data and the alias.

26 Claims, 1 Drawing Sheet

(56) References Cited

U.S. PATENT DOCUMENTS

| | | |
|---|---|---|
| 2002/0072975 A1 | 6/2002 | Steele et al. |
| 2002/0080968 A1 | 6/2002 | Olsson |
| 2003/0187726 A1 | 10/2003 | Bull et al. |
| 2004/0122730 A1 | 6/2004 | Tucciarone et al. |
| 2004/0139025 A1 | 7/2004 | Coleman |

FOREIGN PATENT DOCUMENTS

| | | |
|---|---|---|
| FR | 2808398 | 11/2001 |
| WO | 0045302 A1 | 8/2000 |
| WO | 0063855 | 10/2000 |
| WO | 0109771 | 2/2001 |

OTHER PUBLICATIONS

Moore, David J. "Database Marketing Holds Even More Promise Online; Advertisers Can Save Money by Targeting Ads Via Anonymous User Profiles." Advertising Age, pS20, Mar. 1, 1999.

"Consumer Privacy vs. Online Profiling: Ncognito Bridges the Gap", PR Newswire, Jan. 10, 2000.

"TriVida Launches Internet's First Consumer Privacy Panel; Consumers Now Control What the Network Knows", Business Wire, Feb. 3, 2000.

"Ad Serves Opt for Opt-Out in Proposed Privacy Code", Advertising Age, v71, n20, p. C1, May 8, 2000.

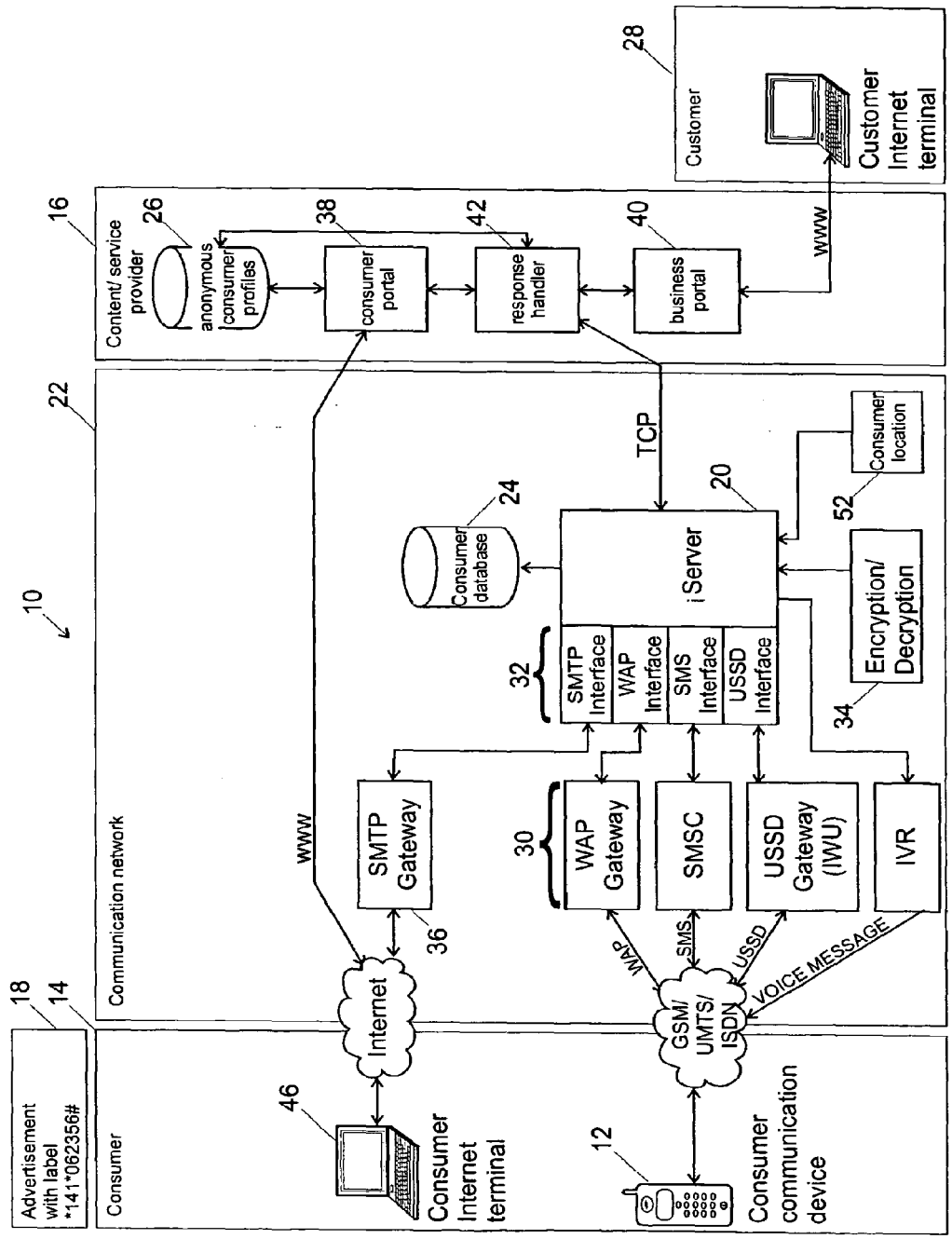

METHOD FOR TRANSMITTING AN ANONYMOUS REQUEST FROM A CONSUMER TO A CONTENT OR SERVICE PROVIDER THROUGH A TELECOMMUNICATION NETWORK

CLAIM OF PRIORITY

This application is a continuation of U.S. patent application Ser. No. 12/537,453 that was filed on Aug. 7, 2009, which is a continuation of U.S. patent application Ser. No. 10/704,859 that was filed on Nov. 10, 2003, and which in turn is a continuation of PCT Application No. PCT/EP02/04009 filed on Apr. 10, 2002. Each of the above identified applications is hereby incorporated herein by reference in its entirety.

The present invention relates to communication conveying a request (label) from a consumer to a content or service provider wherein, via operation of a logic unit within a communication network, the consumer is positively identifiable and yet anonymous. The present invention further relates to a system in which this request can be relayed to customers, such as advertisers, merchants, etc, of said service or content provider for interconnection with their information systems.

The invention further relates to a method allowing consumers to easily and anonymously send requests and obtain responses providing additional, more detailed information and assistance on selected topics from a source such as a supplier of consumer goods or services.

The present invention further relates to a method allowing consumers to purchase labeled goods anonymously.

BACKGROUND OF THE INVENTION

As technologies such as computer Internet and personal mobile communication continue to see increases in distribution and use, there is an increased interest in accessing/incorporating these technologies to reach consumers. In many respects, these technologies have great potential as avenues for suppliers of consumer goods and services to reach and interact with consumers and to track the activity of consumers. However, there are counter weighing factors to consider. One very important factor is the issue of privacy.

Many consumers may be reluctant to initiate contact in order to purchase goods or to get more information about them with a goods or services supplier solely on the grounds that the supplier would then know the identity of the consumer. It is possible that such consumers are apprehensive that such knowledge of identity could lead to unwanted continued contact by the goods or services supplier or even possible dissemination of the identity information to a third party (e.g., another supplier of goods or services).

As such, it is likely that such consumers may be more likely to initiate contact with a supplier of goods or services if the consumer had a greater level of anonymity and had a greater level of control as to ultimate disclosure of their identity. Thus, there is a need to provide such benefits.

Also, computer Internet and personal mobile communication providers realize that potential exists for increased utilization of their services and content. However, many regulations are in place to control access of consumer information and access based upon such information. Such regulations are typically based upon an underlying premise of consumer privacy. However, marketing of, sales of, information about or relationships around consumer goods and services may become more effective if the marketing is targetable rather than just presented via a mass-marketing approach. Thus, there is a beneficial need to provide for such increased utilization of the communication technologies. Also, consumer profiling will over time deliver great value.

Due to the lack of interactivity, consumer response monitoring is the weakest link in the conventional advertising value chain. It would be beneficial to provide a solution and take advantage of the resulting business opportunities.

SUMMARY OF THE INVENTION

In accordance with one aspect, the present invention provides a method allowing a content or service provider to establish an anonymous profile of a consumer using at least one request sent by the consumer through a communication network. A purpose of this profile is to provide a suitable and efficient response to the requester. The request sent by the consumer includes identification data of the consumer. The identification data is substituted in the network with an alias so as to anonymize the request. The identification data is not accessible to the content or service provider and there is a one-to-one and immutable correspondence between the identification data and the alias.

In accordance with another aspect, the present invention provides an arrangement for interacting with a communication consumer identified through at least one identification unique to the consumer. The arrangement includes a content or service provider, which owns a profile about the consumer. This profile is used to adapt the response to the request. Its characteristic may be relayed to the business customer if the answer is to be provided via its own information systems or business processes. The profile is established at least partially on the basis of a request sent over a communication network by the consumer. The profile of the consumer contains an alias insufficient to directly identify the consumer. In another embodiment, the alias is computed on the fly, e.g. using encryption techniques, from identification data of the consumer. The arrangement includes a communication network containing a logic unit allowing the request to be routed between the consumer and the content or service provider via identification data of the consumer. The identification data is not accessible to the content or service provider and there is a one-to-one and immutable correspondence between the identification data and the alias.

Methods for anonymizing messages sent over a mobile network are known as such. In the known methods, the alias is mapped only temporary with the identification data of the mobile user. This means that the correspondence between the identification of a mobile user and his alias varies frequently, so that the recipient of a series of messages sent by the same mobile user is unaware of this unique origin. Such methods do not therefore allow the recipient to establish an anonymous profile of the mobile users.

The foregoing and other features and advantages of the present invention will become apparent to those skilled in the art to which the present invention relates upon reading the following description with reference to the accompanying drawing, in which:

The sole FIGURE is a schematic representation of a communication arrangement in accordance with the present invention.

An example of an arrangement 10 in accordance with the present invention is shown in the FIGURE. The example arrangement 10 is utilized to perform at least one example method in accordance with the present invention.

As one aspect, as a specific example of display or printed matters, the method supports conventional editorial content and visual advertising 18 (print media, billboards, yellow pages, television, and the like) by adding request or service labels to such visual content. The labels are identifiers that consumers 14 can use to identify the particular product, service, and/or advertiser per se presented by an advertising customer 28 via the advertising. Labels can be found in print media (displayed in an advertising or editorial context) and on posters/billboards, on products labeled via EAN (European Article Numbering) or UPC (Universal Product Code) barcodes standards, or in electronic media (e.g., spoken on radio or shown/spoken on television). An example of a label is: Q 06 23 56. In one embodiment, labels with 8, 12 and 13 digits are reserved for EAN/UPC product codes. In the following, for the sake of simplicity, we will indifferently refer to "request labels" or "requests". Numbers could also be presented with the equivalents letters on the handset's keypad (e.g. toto instead of 8686).

In one variant embodiment, a method in accordance with the invention utilizes a mobile communication device 12 (mobile phone, personal digital assistant, palmtop, laptop, etc.) or an ISDN terminal of a consumer 14 as a ubiquitous and familiar mass-market product for conveying requests to the content or service provider 16. The device 12 can utilize various formats and the like to send request labels. For example, global system for mobile communication (GSM), global packet radio system (GPRS) network, universal mobile telecommunications system (UMTS), or integrated services digital network (ISDN) can be employed, with the request labels conveyed via USSD, SMS, WAP, SS7, etc.

The mobile communication device 12 permits initiation of an anonymous interaction with a content or service provider 16 or with a customer 28, for example an editorialist or an advertising customer of the service provider 16 if the service provider acts on behalf several customers. Upon perceiving the advertised label 18, in order to initiate and thus enable the interaction with the content or service provider, the consumer 14 enters a request label (e.g., a number or alpha numeric sequence) into his terminal, for example into a mobile communication device 12 in a mobile communication network 22 for transmission thereby. For example, the label is entered as a USSD message (unstructured supplementary service data, for example *141*23459460#) or SMS (short message system) on a mobile network, or as SS7-signalisation messages on an ISDN network.

In one embodiment, each label sent by a consumer 14 elicits a response as selected by the content or service provider 16 or by its customers or partners such as advertisers 28. The response may depend on the profile of the consumer, on the time and location of the consumer when the request was sent and/or on the capabilities of the mobile station currently being used. The response can be synchronous and/or completely or partly deferred, single- or multiple-part, and can be provided via any of several communication channels. Some examples of such communication channels include: unstructured supplementary service data (USSD), short messaging service (SMS), multimedia messaging service (MMS), any messaging or request protocol sent over GMS, GPRS, UMTS or other mobile network system, voice message prepared by an interactive voice response system (IVR), fax, wireless application protocol (WAP), e-mail, links to web content/services, postal delivery, etc.

In accordance with the present invention, a logic unit 20 within a communication network 22, for example a mobile communication network, of the arrangement 10 is operated such that the logic unit only provides an alias of the consumer's identification data (e.g., the consumer's mobile phone number MSISDN) for use by the content or service provider 16. It is to be appreciated that the communication network 22 handles communication for many mobile communication devices 12 and thus many consumers 14. In a first embodiment, aliases are computed on the fly by encrypting the actual consumer identification data with an immutable algorithm. In this case, the logic unit 20 computes the alias each time a new label has to be forwarded. In another embodiment, the corresponding pairs of actual consumer identification data and aliases (e.g., substitute for the identification) are maintained in a database within the communication network 22. In this case, the relationship between the alias and the corresponding identification data can be random.

For each consumer phone number (e.g., a mobile station international subscriber dialing number or MSISDN), the actual phone number is known only by the operator of the logic unit 20 within the communication network 22, but remains unknown to the content or service provider 16, whose policy is to only process anonymous data in order to develop profiling activities that remain viable on the long term and that fulfill legal requirements. The communication network operator thus owns the relationship between the consumer phone number (or other consumer identification data and transactions capabilities) and the corresponding alias. This correspondence may exist for his own customers but also for customers of other mobile operators roaming on his network.

The content or service provider 16 utilizes the anonymous aliases and can create a database 26 containing anonymous consumer profiles. Receiving a label including a new alias will result in the content or service provider 16 creating a new anonymous profile in the anonymous consumers profile database 26. Each time a label is received from the same consumer 14, his profile in the database 26 will be completed and updated with information including for example the advertised product or service, the media in which the advertised label has been published, the terminal used by the consumer, the location, date and time of the consumer when the label was sent, and so on. The profile of a particular anonymous consumer 14 in the database 26 thus depends on his whole history of requests sent in reaction to various interactions with labels from different label publishers (customers) 28. As a plurality of customers 28 share the same content or service provider 16, all interactions of the consumers can be aggregated and leveraged even if the corresponding products and services are independent and offered by different companies, thus allowing the construction of broad and accurate profiles based on a greater amount of requests. This profile data can be used for evaluating the effectiveness of a communication transient or permanent campaign over various media and among different consumer targets, and for preparing precisely targeted one-to-one marketing campaigns.

The different customers 28 access the service provider 16 through an Internet business portal (40) to define the responses that are to be offered to the requests. Requests can also be re-routed in the business portal 40 to their own content/service to give the responses that are to be offered to the requests. As such, the content or service provider 16 owns the anonymous consumer profiles. Thus, two segments of information are present, the encryption/decryption information and the consumer profile information. Neither of these two segments of information, by itself, can be used for personalized one-to-one marketing. Only the combination can be used, by consensus, based on an explicit authorization by the consumer 14, and without compromising either of the complementary information assets. However, there is a one-to-one and immutable correspondence between the identification data and the alias.

The database 26 of consumer profiles, albeit anonymous, is of useful value to customers 28 of the content or service provider 16. The profile database 26 provides a link for the customers 28 (presenters of the advertisings or editorial articles 18 including labels) between their published labels 18 and the consumer 14. For example, the profile database can compute statistics on the profile of the anonymous customers reacting to a particular label by sending a request label, and provide this statistic over a business portal 40 to the customers 28.

Turning to specifics of the presented embodiment, the message sent by the consumer and including the request label passes from the mobile communication device 12 to a gateway 30, whereas the type of gateway depends on the message format used by the consumer. For example, a WAP message will be sent to a WAP gateway, a short message SMS will be sent to a short message service center SMSC, and a USSD message will be sent to a USSD gateway of the consumer's mobile telecommunication network or to another mobile operator 22. The request label will then be forwarded to a logic unit 20 including one interface 32 for each gateway 30 used in the system (e.g., WAP, SMS, or USSD). In one variant embodiment, the logic unit 20 includes an information server (iServer) 20. The iServer 20 handles all request or service labels for the content or service provider 16. The iServer 20 presents a simple socket-based interface to the content or service provider 16 that supports the is various forms of messaging, such as WAP, USSD, and SMS.

The content or service provider 16 can receive consumer-originated messages (e.g., requests) and reply to them or request a response from the customer 28 via an interconnection with its computer applications or information databases. Also, the content or service provider 16 can originate unsolicited "push" messages. But as stated above, the consumer's identification data, for example his MSISDN (mobile telephone number), is "known" only within the communication network 22, and only anonymous aliases are communicated to and thus "known" by the content or service provider 16.

An encryption/decryption portion 34 is utilized to make the identification anonymous. In one embodiment, the logic unit 20, via the encryption/decryption portion 34, generates aliases (CryptIDs) by encrypting the consumers MSISDNs, preferably using the blowfish algorithm. Blowfish is a published secret key encryption algorithm that uses a variable-length key. Further details of blowfish can be found at www-.counterpane.com/bfsverlag.html. An alternative algorithm such as triple DES or IDEA could be integrated. There exists a procedure for translating aliases in the case of a key change. This procedure can be adapted to translate aliases in the case of a phone number plan change or when a single consumer MSISDN changes. An automated solution could be developed in a variant embodiment.

In another embodiment, a database is stored in the iServer 20, which maintains the relationship between the identification data of the consumer (for example his MSISDN, e-mail address, postal address, payment means, etc.) and his anonymous alias. This database should not be confused with the administrative database of the mobile operators: in the case of a company-paid phone, the administrative database will contain the company information for his msisdn whereas the database of the invention will contain personal user information.

It is recommended that in the productive implementation, all communication between the communication network 22 and the content or service provider 16 is secured, for example by establishing an encrypted tunneled connection over the public internet.

A SMTP server 36 is operated within the communication network 22 to communicate with the content or service provider 16 and with the consumers 12. Especially, the anonymized request labels are provided to a consumer portal 38 managed by the content or service provider 16. The information is passed from the consumer portal 38 to the profile database 26 and to the response handler 42. The profile database 26 logs all consumer interactions through request labels in order to allow the reporting activity back to the customer 28. The response handler 42 generates responses according to content definitions. The responses can be personalized using consumer profiles in the database 26.

A business portal 40 of the content or service provider 16 permits interaction between the label-advertising customers, the publication or media 28 and the content or service provider 16. In one embodiment, the interconnection between the customer 28 and the business portal 40 may be via a computer link and could even be web-based or via a batch interface.

The business portal 40 is used by advertising customers 28 first in the pre-publishing period in order to order labels that will be added to his publications and to store predefined responses to expected requests. The business portal also allows via its labels management redirections of requests to content/services located at the content/services provider. Also, the business portal 40 is used during and after the period of label use as a reporting place where the advertising customers can hold statistics and reports about the consumer's interactions with labels from multiple perspectives responding to a particular advertisement.

Within the communication network 22, the anonymous consumer address in the customer response is translated back into a real-world identification. To accomplish this, the response handler 42 interacts with the logic unit 20. This interaction may take any suitable communication format such as TCP plaintext. As such, the logic unit 20 can be considered to have two interfaces, one on the consumer side and a second on the content or service provider side. The first interface 32 receives the request emanating from the consumer 14. The second TCP interface transmits the anonymous request to the content or service provider 16. Also, the second interface receives a response from the content or service provider 16, and the response is forwarded, with alias substituted, through the first interface to the consumer 14.

It is to be noted that the response back to the consumer 14 may be sent to the mobile communication device 12 or to another chosen terminal 46 over USSD, SMS, voice-generated by an interactive voice response server (IVR), WAP, e-mail, links, postal delivery, etc. Responses can be, by default, in the language or type used for sending the request label. However, other response formats can be selected if supported by the content or service provider 16. Further, the responses can be for supplying additional information, entering requests (e.g., configuration, registration, reservations, samples), ticketing, payment services, participation in polls, games, contests, etc.

In a preferred embodiment, consumers can chose to receive responses to request labels by e-mail sent to an address selected by the consumers and stored in a consumer database 24 in the network 22. In one embodiment, e-mail address capture occurs via a process handled by the iServer 20 via the SMTP server 36 within the network 22. The captured e-mail address is stored in the consumer database 24 and correlated with the consumer's identification data (such as his MSISDN) or with his alias. In one variant embodiment, consumer e-mail address capture is done first by requesting an email registration label (temporary email registration ticket) from his mobile station, which will be stored into the consumer database 24 and displayed onto the consumer handset.

The consumer will then send an email including said ticket as subject to the email address capture portion implemented in the iServer 20. The SMTP interface 36 in the iServer 20 will then associate the email address with the consumer alias using the temporary email registration ticket.

The default e-mail destination address (for consumers who have not registered their preferred e-mail address) will be the e-mail address corresponding to the identification of the consumer 14 in the mobile network 22 (say, 0794012858@mobile.ch) and known by the logic unit 20.

The "captured" real-world e-mail address is stored in the consumer database 24.

As such, the content or service provider 16 can send an e-mail response to the consumer 14 via the logic unit 20. The logic unit 20 that have received the email to be sent with the consumer alias from the content/service provider will format the mail to be delivered to the consumer alias with its email address retrieved from the consumer database 24 where the email address of every consumer is stored alongside with the consumer's identification data (such as his MSISDN) or with his alias. The SMTP interface of the logic unit (iServer 20) will then forward the email to the consumer via the SMTP 36.

It is also contemplated that the consumer 14 may chose to be more proactive and to register with the content or service provider 16 in order to get access to services/responses of higher added value. Also, such proactivity may be in the form of directly interacting with the content or service provider 16. The interaction may be via the Internet.

With regard to the consumer 14 choosing to register with the content or service provider 16, the consumer portal 38 supports registration (user pseudonym, password) and management of label responses, in the style of an advanced web-enabled e-mail service. Registration can be anonymous.

Accordingly the consumer portal 38 is multifunctional, in that it can give the consumer 14 an overview of the services. It also offers registered consumers an overview of their individual requests and responses as well as their management, and the possibility of forwarding web links to a private e-mail address.

No registration with the consumer portal 38 is initially needed for most services but it may be set to require both web entries and USSD-based validation. Multiple registrations are possible, i.e. a single consumer may specify that several mobile identities (say, his business number, private number and car-based mobile number) point to the same consumer portal identity. Several consumers, for example a family, may also decide to group their various identities into a single logical group, independently of their respective mobile operator, in order to optimize the value of their interactions via loyalty programs or other incentives.

In one embodiment, after accessing the consumer portal 38 and requesting registration, the consumer 14 selects a user pseudonym and password. The portal 38 sends him a service registration label (temporary registration ticket) over the Internet, which he is asked to send over the logic unit 20 within a time window.

The content or service provider 16 will thus establish the logical link between the alias (encrypted MSISDN) in the received registration label and the pseudonym and password used by the consumer for accessing the consumer portal 38. The content and service provider 16 will then be able to determine which anonymous consumer profile in the database 26 should be updated with the information entered by the consumer identified in the consumer portal by a pseudonym and a password. The content or service provider 16 can thus verify whether the real identity of the anonymous consumer from which he only receives a pseudonym and password, or an alias, is always the same during subsequent interaction. A similar process may be used when a consumer selects to define an e-mail address for his e-mail responses.

As another aspect of the direct interaction, some preferences (language preferences, activation of default e-mail address, preferred response types (USSD only, SMS, WAP, Portal, etc.), service interruption, service cancellation, etc.) can be set by the consumer 14, via a web service panel in the consumer portal 38 and a labels-based service panel accessible via the consumer communication device 12. The service panel uses a collection of predefined service labels allowing the user to select his preferences. The IMEI (International Mobile Equipment Identity) information or any other equivalent information defining the type of device being utilized may be obtained from the network in order to deliver responses with the highest impact. A different service label corresponds to each preference that can be set by the consumer 14; parameters in the service label can set different values for a particular preference. As such, while the majority of labels will allow consumers access to the information they require (request labels), some will also serve to configure the services according to the consumer's personal preferences (service labels).

Registered consumers can also set preferences through the Internet over the consumer portal 38.

In recap, the communication network 22 collects dialed labels tied to consumer identification data, for example phone numbers. The identification data are encrypted or replaced within the communication network 22. The content or service provider 16 receives anonymous requests for responses, generates these according to profiles, and routes the responses back to the logic unit 20 in the communication network 22. The logic unit 20 decrypts the alias in the response from the content or service provider 16 in order to find identification data sufficient to route the response to the consumer over the preferred response channel.

One variant embodiment to consider is with regard to the mobility of the device 12. Consider, for example, that the labels are dialed as USSD sequences. As a USSD code in the example range below 150, the USSD message dialed from a mobile consumer 14 (roaming or not) will be routed to the consumer home mobile network 10, reach the USSD gateway 30 in the network 10, and be passed on to the logic unit 20. An appropriate USSD response to be displayed on the handset can be fed to the USSD is gateway 30, based on a decision (based on label, profile and other possible data) taken by label management.

The information delivered by the network infrastructure to the USSD gateway 30 or to the logic unit 20 consists of the USSD code, the label sent by the consumer 14, the MSISDN, the date and time, and location information from a location portion 52 (e.g., visited network, mobile cell identification, global positioning or the like). Location information may be used to expand the range of services.

There are several possible scenarios for labels usage outside the consumer home mobile network. Consumers logged in another network (either roaming, or subscriber of the other network) may use the same USSD code range, and thus be routed to their home network's USSD gateway or equivalent; where they can be either processed locally or routed to the home mobile network for encryption and other processing. Alternately, another range of USSD codes, or a non-USSD solution, can be used.

Other features can be implemented in various embodiments of the invention. For example, multiple SMSC protocols are possible as the iServer can support all the common SMSC protocols (UCP, CIMD2, SMPP), allowing interworking with other network operators. Immediate IMEI handset identification from the mobile network is possible. Different embodiments of the Multimedia Messaging Service (MMS) can also be used). USSD menu browsing is possible with a WAP-like menu interface to consumers without WAP handsets, over the fast, efficient USSD channel. Over the air (OTA) integration is possible with SIM management, SIM to applet download, and SIM browsing. The label dialing feature can be used to store corresponding URLs over the consumer portal service provided by the label service provider. Access to those URLs is then made via a personal web account, possibly appearing as part of the publication portal. Billing of selected messages and/or responses to users is possible. It is equally possible to charge for messages on any channel (SMS, USSD, WAP). Billing of delivered information or provided services by the network is also possible. For example, the billing can be by debiting a prepaid SIM card or a post-paid consumer account. When the price of the service or good purchased exceeds the direct billing limit defined by the mobile operator, the billing can be transferred to other payments systems like credit card, bank transfers, etc. Adjusting response depending on the possibilities of the mobile station of the consumer (for example on the display size and capabilities, on the brand, operating system, features, etc.) is also possible. Responses may depend on external events (for example the score of a football match), wherein the response may be delayed until the event occurs. Also, a response may depend upon previous requests from other consumers (e.g., voting). Still further, a response may depend upon special accreditations of the consumer.

What is claimed is:

1. A method for allowing a content or service provider to own an anonymous profile of a consumer, comprising:
   receiving, by a networking component of a communication network, at least one request sent from the consumer through the communication network, wherein the request comprises identification data of the consumer; and
   substituting, by a computing component of the communication network, the identification data with an alias so as to anonymize the request with respect to the content or service provider, wherein the identification data is not accessible to the content or service provider and there is a correspondence between the identification data and the alias.

2. The method of claim 1, comprising establishing the anonymous profile by the content or service provider.

3. The method of claim 1, comprising updating the anonymous profile each time a request is received.

4. The method of claim 1, wherein the consumer is a mobile consumer and wherein the communication network is a mobile telecommunication network.

5. The method of claim 4, wherein the request is entered in a mobile communication device and transmitted as unstructured supplementary service data (USSD) through the mobile network.

6. The method of claim 4, wherein the request is included in a short message system (SMS) message.

7. The method of claim 1, wherein the consumer is a fixed consumer, the communication network is an integrated services digital network (ISDN) network, and the request is sent as a SS7 signaling message over the ISDN network.

8. The method of claim 1, comprising sending, by the content or service provider, a single or multiple-part response that includes the alias to the consumer, wherein the alias is substituted with the identification data within the communication network before forwarding the response to the consumer.

9. The method of claim 8, comprising defining, by the consumer or the service provider on behalf of its customer, preferences for the response, the preferences comprising choices among mobile networks messages, USSD, synthesized voice message, fax, e-mail, a link to an Internet or WAP site, or postal delivery.

10. The method of claim 8, wherein the request received by the content or service provider contains a location of the consumer, and wherein the response depends on the location.

11. The method of claim 8, wherein the request received by the content or service provider contains information about a mobile station used by the consumer, and wherein the response depends on the information.

12. The method of claim 8, wherein the content and/or the format of the response depends on at least one of the following:
   sending time of the request,
   external events,
   preceding requests from other consumers,
   consumer profile,
   accreditation level of the consumer.

13. The method of claim 1, wherein the alias is computed by encrypting at least the identification data by means of an immutable encryption algorithm.

14. The method of claim 13, comprising defining the preferences by the consumer with the content or service provider through an Internet web session or with the mobile station and by identifying himself by sending a registration request through the communication network, the registration request being valid during a limited period of time.

15. The method of claim 14, wherein the preferences include the consumer's language.

16. The method of claim 1, wherein a plurality of customers use a shared content or service provider which they access through an Internet business portal to define responses that are to be offered to the requests.

17. The method of claim 1, wherein a plurality of consumers use a common content or service provider for establishing a common profile of the consumers using a plurality of the requests sent by the consumer through the communication network.

18. The method of claim 1, wherein a shared content or service provider relays the requests to a plurality of external systems depending on the request.

19. A system for electronically interacting with a consumer identified through identification data unique to the consumer, comprising:
   one or more components for allowing a content or service provider to own an anonymous profile of a consumer, the one or more components being operable to:
      receive at least one request from the consumer through a communication network, wherein the request comprises identification data of the consumer; and
      substitute the identification data with an alias so as to anonymize the request with respect to the content or service provider, wherein the identification data is not accessible to the content or service provider and there is a correspondence between the identification data and the alias.

20. The system of claim 19, wherein the one or more components are operable to enable establishing the anonymous profile by the content or service provider.

21. The method of claim 19, wherein the one or more components are operable to enable updating the anonymous profile by the content or service provider each time a request is received.

22. The system of claim 17, wherein the one or more components are operable to allow the request to be routed between the consumer and the content or service provider thorough the communication network such that the identification data remains inaccessible to the content or service provider.

23. The system of claim 17, wherein the one or more components comprise, for allowing the routing of requests:

a first interface for receiving the request emanating from the consumer, wherein the request includes the identification data of the consumer, an encoder for substituting the identification data in the request with the alias so as to anonymize the request, wherein the identification data is substituted according to a one-to-one correspondence between the identification data and the alias, and a second interface for transmitting the anonymous request to the content or service provider.

24. The system of claim 23, wherein the second interface receives a response from the content or service provider, the encoder substitutes an alias in the response with the corresponding identification data, and the response is forwarded to the consumer.

25. The system of claim 24, wherein the various parts of the response can be forwarded through any of the following channels: SMS messages, USSD, voice message, fax, e-mail, a link to an Internet or WAP site, or postal delivery.

26. The system of claim 24, wherein the encoder uses an immutable encryption algorithm for substituting the identification data with the alias.

\* \* \* \* \*